United States Patent [19]

Chuujou et al.

[11] Patent Number: 5,494,739
[45] Date of Patent: Feb. 27, 1996

[54] POLYETHYLENE-2,6-NAPHTHALENEDI-CARBOXYLATE FILM

[75] Inventors: Takao Chuujou, Sagamihara; Masahiro Hosoi, Tokyo; Ieyasu Kobayashi; Yasuhiro Saeki, both of Sagamihara, all of Japan

[73] Assignee: Teijin Limited, Osaka, Japan

[21] Appl. No.: 81,308

[22] PCT Filed: Oct. 4, 1993

[86] PCT No.: PCT/JP92/01404

§ 371 Date: Jun. 23, 1993

§ 102(e) Date: Jun. 23, 1993

[87] PCT Pub. No.: WO93/09166

PCT Pub. Date: May 13, 1993

[30] Foreign Application Priority Data

Oct. 31, 1991 [JP] Japan ................... 3-311445

[51] Int. Cl.$^6$ ........................................... G11B 5/00
[52] U.S. Cl. .................. 428/323; 428/325; 428/480; 428/694 SL; 428/694 SG; 428/900; 523/181
[58] Field of Search ................ 428/480, 694 SL, 428/694 SG, 900, 323, 325; 523/181

[56] References Cited

U.S. PATENT DOCUMENTS

| | | | |
|---|---|---|---|
| 4,804,736 | 2/1989 | Utsumi | 528/176 |
| 4,833,019 | 5/1989 | Suwarnasarn | 428/336 |
| 4,861,674 | 8/1989 | Inaba et al. | 428/480 |
| 5,051,292 | 9/1991 | Katoh et al. | 428/141 |

FOREIGN PATENT DOCUMENTS

| | | |
|---|---|---|
| 0199244 | 10/1986 | European Pat. Off. . |
| 0225631 | 6/1987 | European Pat. Off. . |
| 0257611 | 3/1988 | European Pat. Off. . |
| 0401689 | 12/1990 | European Pat. Off. . |
| 62-135339 | 6/1987 | Japan . |
| 1267024 | 10/1989 | Japan . |
| 2202925 | 8/1990 | Japan . |
| 8702172 | 4/1987 | WIPO . |

Primary Examiner—Stevan A. Resan
Attorney, Agent, or Firm—Sherman and Shalloway

[57] ABSTRACT

A biaxially oriented polyethylene-2,6-naphthalenedicarboxylate film, which can be used as a base film for a recording medium capable of high-density recording, characterized in that when h (unit: nm) stands for a height of a protrusion formed on the film surface, the numbers of protrusions in the range of $1 \leq h < 50$, $50 \leq h < 100$, and $100 \leq h$ fall each within a specified range, that the film has a plane orientation coefficient (NS) and an average refractive index ($n_a$) which satisfy the relationship $NS \geq 1.607 n_a - 2.434$, that the film has a surface roughness (Ra) of 2–10 nm and that the film has a heat shrinkage in the longitudinal direction of 0.08% or less when heat-treated under no load at 70° C. for 1 hour.

18 Claims, No Drawings

POLYETHYLENE-2,6-NAPHTHALENEDI-CARBOXYLATE FILM

TECHNICAL FIELD

The present invention relates to a biaxially oriented polyethylene-2,6-naphthalenedicarboxylate film. More specifically, it relates to a biaxially oriented polyethylene-2,6-naphthalenedicarboxylate film useful as a base film for a magnetic recording medium which permits recording for a long period of time and permits high-density recording.

TECHNICAL BACKGROUND

From former years, a polyethylene terephthalate film (PET film) is used widely as a base film for magnetic tapes. In recent years, magnetic tapes are being increasingly required to enable high-density recording for downsizing and for achieving high-quality images. Further, it is also required to decrease the thickness of magnetic tapes, as is typically required of 8-mm video tapes. For these reasons, the magnetic layer-side surface of a magnetic tape is required to be smoothest possible, and the thickness of a magnetic tape is required to be smallest possible.

Due to this, a base film is also required to have a flatter surface and a smaller thickness. However, a PET film used as a base film of conventional home VTR magnetic tapes has a rough surface, and many of PET films fails to satisfy the above-required properties for practical use.

For applying a PET film to a base film for a magnetic tape which permits high-density recording, it is basically required to extremely decrease the surface roughness. However, when the surface roughness is decreased, generally, the lubricity between film surfaces deteriorates, and further, air entrapped between film surfaces is hardly or poorly released, which makes it very difficult to take up the film on a roll. This difficulty also increases as the PET film thickness decreases.

Moreover, as the film thickness decreases, the film is required to have a higher Young's modulus in order to retain the film strength.

A PET film having a high Young's modulus can be obtained by increasing the stretch ratio. However, a film treated at a high stretch ratio generally has a high shrinkage, and a magnetic tape formed therefrom is poor in dimensional stability.

Further, in producing a magnetic tape, a magnetic layer is formed on the surface of a PET film treated at a high stretch ratio, and its surface is treated for smoothing it. Then, the magnetic tape is taken up in the form of a roll, and the magnetic layer of the rolled magnetic tape is thermoset. In the heat treatment for this thermosetting, the smoothly finished magnetic surface and the base film surface are frictionally and tightly contacted to each other due to heat shrinkage. Therefore, a phenomenon that the finished smooth magnetic surface is roughened (phenomenon of imprinting film surface roughness) is amplified, and the electromagnetic characteristics are deteriorated.

For overcoming the above defects of a PET film, Japanese Laid-open Patent Publication No. 62-164,733 (164,733/1987) proposes a biaxially oriented PET film for magnetic recording, which is formed from a polyester containing 0.1 to 0.5% by weight of inert solid particles having an average particle diameter of 0.03 to 0.3 μm as small-sized particles, and 0.001 to 0.05% by weight of inert solid particles having an average particle diameter of 0.2 to 0.8 μm as large-sized particles, a size difference between the large-sized particles and the small-sized particles being at least 0.15 μm in average particle diameter, and which has a surface roughness Ra of 0.003 to 0.012 μm, a Young's modulus of at least 650 kg/mm$^2$ in the longitudinal (machine) direction, and a heat shrinkage of 0.06% or less when heat treated under no load at 70° C. for 1 hour.

On the other hand, polyethylene-2,6-naphthalenedicarboxylate is available as a polyester which is excellent in heat resistance and strength, and it inherently has properties for giving an excellent base film for a magnetic recording medium. And, it has been proposed to use the above polymer for forming a base film for a magnetic recording medium, as will be described below.

For example, Japanese Laid-open Patent Publication No. 58-215,722 (215,722/1983) proposes a polyester film for a magnetic recording medium, whose average refractive index n and plane orientation degree ΔP satisfy the following expressions [1] and [2] and whose average protrusion height on the film surface is 0.015 μm or less.

$$\bar{n} \geq 1.600 \quad [1]$$

$$\Delta P \leq 1.43 \cdot \bar{n} - 2.128 \quad [2]$$

In the above proposal, the polyester includes a polyester produced from 2,6-naphthalenedicarboxylic acid and ethylene glycol.

Japanese Laid-open Patent Publication No. 63-60,732 (60,732/1988) proposes a polyethylene-2,6-naphthalate film containing 0.01 to 10% by weight of inert fine particles having an average particle diameter of 0.1 to 10 μm, in which the ½ crystallization time at 200° C. is 6.0 minutes or less; the plane orientation degree ΔP and an average refractive index n̄ satisfy the following expressions (1) and (2), $$\Delta P \leq 1.43 \cdot \bar{n} - 2.136 \quad (1)$$

$$1.6650 \leq \bar{n} \leq 1.6750 \quad (2);$$

the number A (pieces/mm$^2$) of concavo-convex units, each of which is formed of a protrusion and a dent being present around the protrusion as a core and having a major diameter of at least 0.2 μm, per 1 mm$^2$ of the film surface area satisfies the following expression (3), $$0 < A \leq 15,000 \quad (3);$$

and the variance of thickness in the film length and transverse directions is 8% or less, the film being a polyethylene-2,6-naphthalate film which has a flat surface and lubricity and is excellent in thickness uniformity. It is described that the above film is excellent as a base film for a magnetic recording medium.

Further, Japanese Laid-open Patent Publication No. 62-143,938 (143,938/1987) proposes a polyethylene-2,6-naphthalate film for a high-density magnetic recording medium which is formed of a biaxially oriented film composed mainly of a polyethylene-2,6-naphthalate film, the film satisfying the following:

(a) the tensile stress in every direction in its plane at 5% elongation is at least 13 kg/mm$^2$ and less than 21 kg/mm$^2$, (b) the Young's modulus in every direction in its plane is at least 500 kg/mm$^2$ and less than 800 kg/mm$^2$, (c) the heat shrinkage in every direction in its plane is less than 2.5%, (d) the central line average roughness Ra on the film surface is 0.012 μm or less, and (e) the number of coarse protrusions having a height of at least 1.08 μm is 10 pieces/25 cm² or less, the in-plane deviations of the above (a), (b) and (c) values being 20% or less.

DISCLOSURE OF THE INVENTION

It is an object of the present invention to provide a film formed of polyethylene-2,6-naphthalenedicarboxylate, which can be used as a base film for a magnetic recording medium, particularly a magnetic tape, which permits high-density recording.

More specifically, it is an object of the present invention to provide a film formed of polyethylene-2,6-naphthalenedicarboxylate, which has excellent lubricity and can be easily taken up in the form of a roll and which can give a magnetic tape excellent in dimensional stability, electromagnetic characteristics and running durability when used as a base film for a magnetic tape which permits high-density recording.

According to the present invention, there is provided a biaxially oriented polyethylene-2,6-naphthalenedicarboxylate film which satisfies the following expressions (1)–(3), $$1,000 \leq M_1 \leq 20,000 \text{ pieces/mm}^2 \tag{1}$$

$$0 \leq M_2 \leq 200 \text{ pieces/mm}^2 \tag{2}$$

$$0 \leq M_3 \leq 50 \text{ pieces/mm}^2 \tag{3}$$

wherein when h (unit: nm) stands for a height of a protrusion formed on the film surface, $M_1$ (unit: pieces/mm²) is the number of protrusions in the range of $1 \leq h < 50$, $M_2$ (unit: pieces/mm²) is the number of protrusions in the range of $50 \leq h < 100$, and $M_3$ (unit: pieces/mm²) is the number of protrusions in the range of $100 \leq h$, the film having a plane orientation coefficient NS and an average refractive index $n_a$ which satisfy the following expression (4), $$NS \geq 1.607 n_a - 2.434 \tag{4}$$

the film having a surface roughness (Ra) of 2–10 nm and having a heat shrinkage in the longitudinal direction of 0.08% or less when treated under no load at 70° C. for 1 hour, whereby the above objects of the present invention are achieved.

The present invention will be detailed hereinafter, and other objects of the present invention, more preferred embodiments of the present invention and advantages based thereon will be apparent from the following description.

In the present invention, the polyethylene-2,6-naphthalenedicarboxylate constituting the film contains 2,6-naphthalenedicarboxylic acid as the main dicarboxylic acid component, while it may contain a small &mount of a component from other dicarboxylic acid copolymerized. Further, it is composed mainly of a component from ethylene glycol, while it may contain a small amount of & component from other glycol copolymerized. Examples of the dicarboxylic acid other than the naphthalenedicarboxylic acid include aromatic dicarboxylic acids such as terephthalic acid, isophthalic acid, diphenylsulfonedicarboxylic acid and benzophenonedicarboxylic acid; aliphatic dicarboxylic acids such as succinic acid, adipic acid, sebacic acid and dodecanedicarboxylic acid; and alicyclic dicarboxylic acids such as hexahydroterephthalic acid, 1,3-adamantanedicarboxylic acid, etc. Examples of the glycol other than the ethylene glycol include 1,3-propanediol, 1,4-butanediol, 1,6-hexanediol, neopentyl glycol, 1,4-cyclohexanedimethanol and p-xylylene glycol.

In the polyethylene-2,6-naphthalenedicarboxylate, the amount of a component from 2,6-naphthalenedicarboxylic acid based on the total acid-derived component is preferably at least 80 mol %, particularly preferably at least 90 mol %. The amount of a component from ethylene glycol based on the total glycol-derived component is preferably at least 80 mol %, particularly preferably at least 90 mol %.

The intrinsic viscosity [η] of the polyethylene-2,6-naphthalenedicarboxylate, which serves as a measure of its molecular weight, is preferably 0.45 to 0.90 dl/g, particularly preferably 0.50 to 0.90 dl/g (o-chlorophenol, 25° C.).

The polyethylene-2,6-naphthalenedicarboxylate may contain additives such as a stabilizer and a colorant as required.

The above polyethylene-2,6-naphthalenedicarboxylate can be produced by a melt-polymerization method known per se, which is generally employed for producing polyesters. In this case, additives such as a catalyst may be optionally added as required.

The height h (unit: nm) of protrusions formed on the film surface and the number of the protrusions satisfy the following specific conditions. That is, the following expressions (1)–(3) are satisfied.

$$1,000 \leq M_1 \leq 20,000 \text{ pieces/mm}^2 \tag{1}$$

$$0 \leq M_2 \leq 200 \text{ pieces/mm}^2 \tag{2}$$

$$0 \leq M_3 \leq 50 \text{ pieces/mm}^2 \tag{3}$$

wherein $M_1$ (unit: pieces/mm²) is a number of protrusions in the range of $1 \leq h < 50$, $M_2$ (unit: pieces/mm²) is a number of protrusions in the range of $50 \leq h < 100$, and $M_3$ (unit: pieces/mm²) is a number of protrusions in the range of $100 \leq h$.

In the above conditions, the maximum height of the protrusions is preferably 1,000 nm or less, particularly preferably 500 nm or less. In the present invention, the number of protrusions having a height of h<1 nm is not specially limited.

In the film surface properties concerning the protrusions, preferably, all of the following expressions are satisfied.

$$1,500 \leq M_1 \leq 20,000 \text{ pieces/mm}^2$$

$$5 \leq M_2 \leq 200 \text{ pieces/mm}^2$$

$$0 \leq M_3 \leq 50 \text{ pieces/mm}^2$$

More preferably, all of the following expressions are satisfied.

$$2,000 \leq M_1 \leq 15,000 \text{ pieces/mm}^2$$

$$10 \leq M_2 \leq 150 \text{ pieces/mm}^2$$

$$0 \leq M_3 \leq 40 \text{ pieces/mm}^2$$

Particularly preferably, all of the following expressions are satisfied.

$$2,000 \leq M_1 \leq 5000 \text{ pieces/mm}^2$$

$$10 \leq M_2 \leq 100 \text{ pieces/mm}^2$$

$$0 \leq M_3 \leq 30 \text{ pieces/mm}^2$$

The film having the above-described film surface properties can be obtained, for example, by adding one kind of inert solid fine particles or at least two kinds of inert solid fine particles having different average particle diameters to polyethylene-2,6-naphthalenedicarboxylate, and molding the resultant composition into a film.

Examples of the inert solid fine particles preferably include (1) silicon dioxide (including hydrate, silica sand and quartz); (2) alumina; (3) silicates containing at least 30% by weight of an $SiO_2$ component (e.g., amorphous or crystalline clay mineral and aluminosilicate (including a calcined material and hydrate), chrysotile, zircon and fly ash); (4) oxides of Mg, Zn, Zr and Ti; (5) sulfides of Ca and Ba; (6) phosphates of Li, Na and Ca (including primary and secondary phosphates); (7) benzoates of Li, Na and K; (8) terephthalates of Ca, Ba, Zn and Mn; (9) titanares of Mg, Ca, Ba, Zn, Cd, Pb, Sr, Mn, Fe, Co and Ni; (10) chromates of Ba and Pb; (11) carbon (e.g., carbon black and graphite); (12) glass (e.g., powdered glass and glass beads); (13) carbonates of Ca and Mg; (14) fluorite; and (15) ZnS.

Specifically, particularly preferred are silicon dioxide, silicic acid anhydride, hydrous silicic acid, aluminum oxide, aluminum silicate (including calcined material and hydrates), monolithium phosphate, trilithium phosphate, sodium phosphate, calcium phosphate, barium sulfate, titanium oxide, lithium benzoate, double salts (including hydrates) of these compounds, powdered glass, clay (including kaolin, bentonite and china clay), talc, diatomaceous earth and calcium carbonate. The most preferred are silicon dioxide, titanium oxide and calcium carbonate.

Preferably, each particle of these inert solid particles is one which is not composed of a secondary particle formed by the agglomeration of primary particles but is substantially composed of non-agglomerated particle.

When only one kind of inert solid fine particles are added, their average particle diameter is preferably 0.1–1.0 μm, particularly preferably 0.2–0.8 μm. When two kinds of inert solid particles having different average particle diameters are added, the average particle diameter of those having smaller particle diameters is preferably approximately 0.05–0.3 μm, and the average particle diameter of those having larger particle diameters is preferably approximately 0.3–1.0 μm.

The amount of the inert solid fine particles per 100 parts by weight of the polyethylene-2,6-naphthalenedicarboxylate is desirably 0,005–1.0 part by weight, particularly desirably 0.01–0.8 part by weight.

As for the time of addition of the inert solid fine particles to the polyethylene-2,6-naphthalenedicarboxylate, they can be added to monomer(s) before the polymerization to produce the polyethylene-2,6-naphthalenedicarboxylate, or they can be kneaded with the polyethylene-2,6-naphthalenedicarboxylate in an extruder in pelletizing the polymerized polyethylene-2,6-naphthalenedicarboxylate after the polymerization, or they can be added to and dispersed in the polyethylene-2,6-naphthalenedicarboxylate in an extruder before melt-extruding the polyethylene-2,6-naphthalenedicarboxylate in the form of a sheet. It is generally preferred to add them before the polymerization in view of dispersibility.

However, the means for obtaining a film having the film surface properties specified in the present invention is not limited only to the methods in which the inert solid fine particles are added to allow the polyethylene-2,6-naphthalenedicarboxylate to contain them. There is also preferably employable a method in which a proper amount of a particle source is formed by adding a phosphor component or other necessary additive(s) at the time of polymerization thereby to allow the inert solid fine particles to be present in a film, or a method in which a polymer prepared by polymerization at the time of which a phosphor component is added and a polymer prepared by polymerization after having added the inert solid fine particles are blended.

In the present invention, the film surface roughness (Ra) is 2–10 nm, preferably 5–10 nm.

When the above properties of the protrusion height and protrusion number are satisfied and when the scope of the above surface roughness (Ra) is satisfied, the film shows a decreased coefficient of friction and its handling is made easy. Further, it is made easy to take up the film in the form of a roll. Furthermore, when this film is used as a base film for a magnetic tape, the magnetic tape shows improved electromagnetic characteristics and little occurrence of dropout.

Depending upon the form of the inert solid particles, e.g., the form of a plate or a sphere, and the particle diameter and amount to be blended of the inert solid particles, and further, depending upon the particle size distribution of said fine particles, the height and number of the protrusions on the film surface and the film surface roughness (Ra) vary. Moreover, depending upon film production conditions, e.g., conditions such as stretch ratio and heat treatment temperature, the height and number of the protrusions on the film surface and the film surface roughness (Ra) vary. The relationship between these factors, which affect the film surface properties, and the height and number of the protrusions on the film surface and the relationship between the above factors and the film surface roughness (Ra) can be experimentally determined beforehand. Therefore, a film which satisfies the above expressions (1)–(3) and has a surface roughness (Ra) of 2–10 nm can be easily produced.

In the polyethylene-2,6-naphthalenedicarboxylate film of the present invention, the plane orientation coefficient NS and the average refractive index $n_a$ satisfy the following expression (4).

$$NS \geq 1.607 n_a - 2.434 \qquad (4)$$

In the above expression the plane orientation coefficient NS is determined by the following expression (5), and the average refractive index $n_a$ is determined by the following expression (6).

$$NS = \frac{n_x + n_y}{2} - n_z \qquad (5)$$

$$n_a = \frac{n_x + n_y + n_z}{2} \qquad (6)$$

$n_x$ is the refractive index of a biaxially oriented film in the machine direction, $n_y$ is the refractive index in the direction perpendicular to the machine direction, and $n_z$ is the refractive index in the film thickness direction. A film which satisfies the range specified in the expression (4) has high strengths, i.e., high Young's moduli, in the longitudinal and transverse directions of the base film. As a result, a magnetic tape formed from this film is excellent in running properties and electromagnetic characteristics. That is, the tape undergoes almost no tape-edge bending or tape elongation in running, and sufficiently contacts a video rotary head, and the tape is excellent in electromagnetic characteristics.

Thus, the biaxially oriented polyethylene-2,6-naphthalenedicarboxylate film of the present invention preferably has a Young's modulus (EM) of at least 600 kg/mm² in the longitudinal direction and a Young's modulus (ET) of 600–1,100 kg/mm² in the transverse direction.

As means for obtaining a film which satisfies the range specified in the expression (4) and has high Young's moduli, there may be employed a method in which the film is simultaneously stretched with a roll or a stenter in the longitudinal and transverse directions, a method in which the film is consecutively stretched in the longitudinal and transverse directions, or a method in which the film is stretched a plurality of times in the longitudinal and transverse directions.

The polyethylene-2,6-naphthalenedicarboxylate film of the present invention has a heat shrinkage of 0.08% or less in the longitudinal direction when heat-treated under no load at 70° C. for 1 hour. The more preferred heat shrinkage is 0.04% or less. When this heat shrinkage is 0.08% or less, the replaying signalized magnetic tape undergoes little thermal irreversible change and causes little skew pattern on TV even if the temperatures in recording and reproducing with a VTR differ. Further, owing to the low heat shrinkage, the imprinting of the fine concavo-convex form of the base film surface on the magnetic layer surface (phenomenon of imprinting film surface roughness) hardly occurs, and the magnetic surface roughness is maintained.

As means for satisfying the above heat shrinkage, there is a method in which the film is subjected to relaxation treatment by passing it through a nip formed by two rolls having different velocities at a temperature from the glass transition temperature (Tg) of polyethylene-2,6-naphthalenedicarboxylate or above to the melting point thereof or below, although the means shall not be limited to this method.

Although not specially limited, the polyethylene-2,6-naphthalenedicarboxylate film of the present invention preferably has a thickness of 75 μm or less. To cope with a decrease in the thickness of the base film based on the improvement of the magnetic layer in strength, further, the thickness of the film is preferably 62 μm or less, more preferably 50 μm or less. Further, to cope with the need to downsize devices using a magnetic recording medium and decrease the thickness of a recording medium for recording a long period of time, the thickness of the base film is preferably 25 μm or less, more preferably 12 μm or less, particularly preferably 2–12 μm.

When the biaxially oriented polyethylene-2,6-naphthalenedicarboxylate film of the present invention is used for producing a magnetic recording tape, the magnetic tape is excellent in running properties and the contact pressure between the tape and a head in a video tape recorder increases. Therefore, electromagnetic characteristics necessary for high-density recording can be obtained. Further, since troubles such as tape-edge bending and tape elongation decrease, and since the thermal stability is excellent, the skew strain decreases. Therefore, the biaxially oriented polyethylene-2,6-naphthalenedicarboxylate film of the present invention is useful as a base film for high-density recording tapes which permit recording for a long period of time, particularly for a 8-mm video tape, a digital.audio tape (DAT), a digital.compact.cassette tape (DCC), etc., and for a metal tape.

The biaxially oriented polyethylene-2,6-naphthalenedicarboxylate film of the present invention is particularly useful as a base film for a magnetic tape. The magnetic tape can be produced by forming a magnetic layer on one surface or each surface of the base film of the present invention. The magnetic layer and the method for forming the magnetic layer on a base film are known per se, and known magnetic layers and known methods for forming magnetic layers can be employed in the present invention.

For example, when the magnetic layer is formed on the base film by coating a magnetic coating composition on the base film, the ferromagnetic powder for use in the magnetic layer is selected from known ferromagnetic materials such as $\gamma$-$Fe_2O_3$, Co-containing $\gamma$-$Fe_2O_3$, Co-coated $Fe_3O_4$, $CrO_2$ and barium ferrite. The binder for use with the magnetic powder is selected from known thermoplastic resins, thermosetting resins, reactive resins and mixtures of these. These resins include a vinyl chloride-vinyl acetate copolymer and polyurethane elastomer.

EXAMPLES

The present invention will be further explained hereinafter by reference to Examples.

The physical properties and characteristics in the present invention were measured and/or are defined as follows.

(1) Number of protrusions on surface

A film surface was measured for a degree of a three-dimensional roughness with a non-contact three-dimensional roughness tester (TOPO-3D) supplied by WYKO Corporation at a measurement magnification of 40 times at a measurement area of 242 μm×239 μm (0.058 $mm^2$). The average roughness of the film surface was obtained by protrusion analysis and then the histogram of heights of protrusions on the surface based on the above average roughness and the number of protrusions were prepared. The numbers of protrusions in the ranges of $1 \leq h < 50$, $50 \leq h < 100$ and $100 \leq h$ were read. The surface of one film was measured five times, and the numbers of protrusions were added up and converted to the number of protrusions per a unit area (1 $mm^2$).

(2) Refractive index

A film was measured for an orientation degree with a molecular orientation meter MOA-2001A supplied by Kanzaki Paper Mfg. Co., Ltd., and at the same time measured for a refractive index with an Abbe refractometer using sodium D ray (589 nm) as a light source. A graph for a correlation between the orientation degree and the refractive index was drawn, and a refractive index of a large value was determined on the basis of the graph for the correlation.

(3) Film surface roughness (Ra)

A chart (film surface roughness curve) was prepared with a needle-contacting type surface roughness tester (Surfcoder 30C, supplied by Kosaka Laboratories Ltd.) with a needle radius of 2 μm under a needle pressure of 30 mg. A portion having a measured length L in the direction of its center line was picked up from the film surface roughness curve. The center line of this portion picked up was taken as an X axis, the direction of the length multiplication was taken as a Y axis, and the roughness curve was expressed as Y=f(x). The value (Ra; μm) given by the following equation was defined as a film surface roughness.

$$Ra = \frac{1}{L} \int_0^L |f(x)| dx$$

In the present invention, the measured length was set at 1.25 mm, and the cut-off value was 0.08 mm. The measurement was repeated five times, and the average value was taken as Ra.

(4) Electromagnetic characteristics

A magnetic tape for video use was measured for an S/N ratio with a noise meter supplied by Shibasoku Co., Ltd. Further, a difference between the so-obtained S/N ratio and the S/N ratio of a tape of Comparative Example 3 in Table 1 was determined. A VTR, EV-S700, supplied by Sony Co., Ltd., was used for measurement.

(5) Running durability of magnetic tape

While a magnetic tape was allowed to run and stop repeatedly with EV-S700 supplied by Sony Co., Ltd., for 100 hours, the tape was examined on its running state and measured for its output. The running durability of the tape was evaluated as follows.

<Evaluation based on 3 ratings>

○: Tape edge does not bend and causes no wavy or crinkly form. Further, no abrasion occurs, and no white dust adheres.

Δ: Tape edge bends and becomes wavy or crinkle to some extent. Further, adherence of a small amount of white dust is observed.

X: Tape edge shows extraordinary bending and a wavy or crinkle form. Further, the tape is heavily abraded, and a large amount of white dust occurs.

(6) Heat shrinkage

A film having a length of about 30 cm and a width of 1 cm, which had been accurately measured for its length in advance, was placed in an oven at 70° C. under no load, and heat-treated for 1 hour. Then, the film was taken out of the oven, and allowed to stand until it had a room temperature, and measured for a length to determine a change in the length. The heat shrinkage was determined by the following equation, $$\text{Heat shrinkage (\%)} = \frac{\Delta L}{L_0} \times 100$$

in which $L_0$ is the length before the heat treatment and $\Delta L$ is the amount of a dimensional change.

(7) Skew

A video tape used for recording at an ordinary temperature (20° C.) at an ordinary humidity was heat-treated at 70° C. for 1 hour, and the tape was played back at an ordinary temperature at an ordinary humidity. And, a skew deviation was read at a head switching point.

(8) Defect-free product ratio of rolled tapes

A film was taken up in a roll form having a film width of 500 mm and a film length of 4,000 m to prepare 1,000 rolls. The defect-free product refers to the following products.

A film is taken up cylindrically, and the film roll has no square deformation and has no film portion sagging.

A film roll has no occurrence of wrinkles.

(9) Young's modulus

A film was cut to prepare a sample having a width of 10 mm and a length of 150 mm, and the sample was tested with an Instron type universal tensile tester at an interchuck distance of 100 mm and at a tension rate of 100 mm/minute. The Young's modulus at an initial time of tension application was determined on the basis of the resultant load-elongation ratio curve.

EXAMPLE 1

Polyethylene-2,6-naphthalenedicarboxylate containing 0.2% by weight of silica particles (non-agglomerate particles) whose average particle diameter was 0.25 μm and having an intrinsic viscosity (measured in o-chlorophenol as a solvent at 25° C.) of 0.62 dl/g was dried at 170° C., and then melt-extruded at 300° C., and the extrudate was rapidly cooled and solidified on a casting drum kept at 60° C. to give an unstretched film having a thickness of 180 μm.

The above unstretched film was stretched, between two rolls having velocity differences, at a temperature of 125° C. by 4.95 times in the longitudinal direction, further stretched with a tenter by 5.25 times in the transverse direction, and then heat-treated at 215° C. for 10 seconds. Further, the stretched film was subjected to relaxation treatment in an oven kept at 110° C. according to a floating heat-treatment method, whereby the film shrank by 0.3%.

Thus, a biaxially oriented polyethylene-2,6-naphthalenedicarboxylate film having a thickness of 7 μm was taken up.

Components shown below were placed in a ball mill, and kneaded and dispersed for 16 hours. Then, 5 parts by weight of an isocyanate compound (Desmodur L, supplied by Bayer A G) was added, and the resultant mixture was sheared and dispersed at a high velocity for one hour to obtain a magnetic coating composition.

| Composition of magnetic coating composition | |
|---|---|
| Needle-like Fe particles | 100 parts by weight |
| Vinyl-chloride-vinyl acetate copolymer (S-Lec 7A, supplied by Sekisui Chemical Co., Ltd.) | 15 parts by weight |
| Thermoplastic polyurethane resin | 5 parts by weight |
| Chromium oxide | 5 parts by weight |
| Carbon black | 5 parts by weight |
| Lecithin | 2 parts by weight |
| Fatty acid ester | 1 part by weight |
| Toluene | 50 parts by weight |
| Methyl ethyl ketone | 50 parts by weight |
| Cyclohexanone | 50 parts by weight |

The so-obtained magnetic coating composition was applied to one surface of the above-obtained polyethylene-2,6-naphthalenedicarboxylate film such that it had the coating thickness of 3 μm, and the resultant coating was then subjected to orientation treatment in a direct current magnetic field at 2,500 Gauss. Thereafter, the coating was dried under heat at 100° C. and super-calendered (linear pressure 200 kg/cm, temperature 80° C.), and the resultant tape was taken up. The so-obtained tape roll was allowed to stand in an oven at 55° C. for 3 days.

Further, a back-coating layer coating composition having the following composition was applied such that the thickness was 1 μm and dried, and the resultant film was slit to a width of 8 mm to give a magnetic tape.

| Back-coating layer coating composition | |
|---|---|
| Carbon black | 100 parts by weight |
| Thermoplastic polyurethane resin | 60 parts by weight |
| Isocyanate compound (Coronate L, supplied by Nippon Polyurethane Co., Ltd.) | 18 parts by weight |
| Silicone oil | 0.5 part by weight |
| Methyl ethyl ketone | 250 parts by weight |
| Toluene | 50 parts by weight |

Table 1 shows the properties of the above-obtained film and tape. As is clear in this Table, the defect-free product ratio of rolled tapes was excellent, and the electromagnetic characteristics, running durability and skew were also excellent.

EXAMPLE 2

An unstretched film was obtained in the same manner as in Example 1 except that the silica particles as the inert solid fine particles were replaced with 0.2% by weight of silica particles (non-agglomerate particles) having an average particle diameter of 0.1 μm and 0.014% by weight of calcium carbonate particles (non-agglomerate particles) having an average particle diameter of 0.6 μm. The unstretched film was stretched by 2.3 times in the longitudinal direction at 130° C., and then stretched by 4.0 times in the transverse direction at 130° C. Thereafter, the so-stretched film was subjected to intermediate heat-treatment at 160° C. Further, this film was stretched by 2.6 times in the longitudinal direction at 170° C., stretched by 1.3 times in the transverse direction at 170° C., and heat-treated at 215° C. Further, the resultant film was subjected to floating heat treatment in oven kept at 110° C. to give a biaxially oriented film having a thickness of 7 μm.

Thereafter, the above-obtained film was treated in the same manner as in Example 1 to obtain a tape. Table 1 shows the results. The results were as excellent as those in Example 1.

EXAMPLE 3

An unstretched film was obtained in the same manner as in Example 1 except that the silica particles as the inert solid fine particles were replaced with 0.1% by weight of alumina particles (non-agglomerate particles) having an average particle diameter of 0.2 μm and 0.014% by weight of calcium carbonate particles (non-agglomerate particles) having an average particle diameter of 0.6 μm. The unstretched film was stretched by 2.3 times in the longitudinal direction at 130° C., and then stretched by 4.0 times in the transverse direction at 130° C. Thereafter, the so-stretched film was subjected to intermediate heat-treatment at 160° C. Further, this film was stretched by 2.0 times in the longitudinal direction at 170° C., stretched by 2.0 times in the transverse direction at 170° C., and heat-treated at 215° C. Further, the resultant film was subjected to floating heat treatment in oven kept at 110° C. to give a biaxially oriented film having a thickness of 7 μm.

Thereafter, the above-obtained film was treated in the same manner as in Example 1 to obtain a tape. Table 1 shows the results. The results were as excellent as those in Example 1.

COMPARATIVE EXAMPLE 1

A film and a tape were obtained in the same manner as in Example 1 except that the silica particles as inert solid fine particles were replaced with 0.25% by weight of silicon oxide particles (non-agglomerate particles) having an average particle diameter of 0.6 μm. Table 1 shows the results. Both low protrusions and high protrusions were present in a great number on the base film surface, and the surface roughness (Ra) of the base film was also very high. Therefore, the electromagnetic characteristics were considerably poor as compared with those in Example 1, and the running durability was also inferior.

COMPARATIVE EXAMPLE 2

An unstretched film was obtained in the same manner as in Example 1 except that the silica particles as inert solid fine particles were replaced with 0.2% by weight of silica particles (non-agglomerate particles) having an average particle diameter of 0.3 μm and 0.1% by weight of calcium carbonate particles (non-agglomerate particles) having an average particle diameter of 1.2 μm. The unstretched film was stretched by 2.3 times in the longitudinal direction at 130° C., and then stretched 3.8 times in the transverse direction at 130° C. Thereafter, the so-stretched film was subjected to intermediate heat-treatment at 160° C. Further, this film was stretched by 2.5 times in the longitudinal direction at 170° C., and heat-treated at 245° C. Thus, a film and a tape were obtained in the same manner as in Example 1. The base film had many coarse protrusions, and its surface roughness (Ra) was very high. Hence, the magnetic surface was also toughened, and the electromagnetic characteristics were considerably poor as compared with those in Example 1. Further, since the plane orientation degree was low, the tape edge bent in running. Further, white dust extraordinarily occurred due to abrasion, and the running durability was quite poor.

COMPARATIVE EXAMPLE 3

An unstretched film was obtained in the same manner as in Example 1 except that the silica particles as inert solid fine particles were replaced with 0.3% by weight of silica particles (non-agglomerate particles) having an average particle diameter of 0.1 μm and 0.14% by weight of calcium carbonate particles (non-agglomerate particles) having an average particle diameter of 0.6 μm. The unstretched film was stretched by 3.5 times in the longitudinal direction at 125° C., and then stretched by 3.8 times in the transverse direction at 130° C. Thereafter, the so-stretched film was heat-treated at 245° C. A film and a tape were obtained in the same manner as in Example 1. As shown in Table 1, in this Comparative Example 3, the requirement defined by the expression (4) was not satisfied, the base film had a low plane orientation degree, and the contact to a video head in tape running was weak. Therefore, the electromagnetic characteristics were poor as compared with those in Example 1, and the running durability was also inferior.

COMPARATIVE EXAMPLE 4

An unstretched film was obtained in the same manner as in Example 1 except that the silica particles as inert solid fine particles were replaced with 0.2% by weight of silica particles (non-agglomerate particles) having an average particle diameter of 0.1 μm and 0.02% by weight of calcium carbonate particles (non-agglomerate particles) having an average particle diameter of 0.6 μm. Thereafter, the stretched film was treated in the same manner as in Example 1 except that the relaxation treatment was omitted, to give a film and a tape. Table 1 shows the results. Since the base film had a high heat shrinkage, the skew was large. Further, due to the effect of imprinting a film surface roughness, the magnetic surface was roughened, and the electromagnetic characteristics were defective to some extent.

COMPARATIVE EXAMPLE 5

A biaxially oriented film having a thickness of 7 μm was obtained in the same manner as in Example 1 except that the silica particles as inert solid fine particles were replaced with 0.03% by weight of silica particles (non-agglomerate particles) having an average particle diameter of 0.05 μm. Since, however, the base film was defective in lubricity, it was impossible to take it up, and no magnetic tape was obtained therefrom.

TABLE 1

|  | Unit | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|
| Base film properties | | | | | | | | | |
| Number of protrusions on surface | | | | | | | | | |
| $M_1$ ($1 \leq h < 50$) | pcs/mm² | 15619 | 3507 | 4301 | 4988 | 24114 | 4826 | 4491 | 912 |
| $M_2$ ($50 \leq h < 100$) | " | 64 | 36 | 55 | 1936 | 2218 | 58 | 39 | 0 |
| $M_3$ ($100 \leq h$) | " | 0 | 18 | 23 | 351 | 2098 | 31 | 26 | 0 |
| Refractive Index: | | | | | | | | | |
| $n_x$ | — | 1.761 | 1.777 | 1.727 | 1.761 | 1.769 | 1.750 | 1.761 | 1.761 |
| $n_y$ | — | 1.759 | 1.731 | 1.794 | 1.759 | 1.707 | 1.751 | 1.759 | 1.759 |
| $n_z$ | — | 1.486 | 1.482 | 1.482 | 1.486 | 1.506 | 1.508 | 1.486 | 1.486 |
| Average refractive Index: $N_a$ | — | 1.669 | 1.664 | 1.668 | 1.669 | 1.661 | 1.670 | 1.669 | 1.669 |
| $1.607 N_a - 2.434$ | — | 0.248 | 0.240 | 0.246 | 0.248 | 0.235 | 0.250 | 0.248 | 0.248 |
| Plane orientation coefficient: NS | — | 0.274 | 0.272 | 0.278 | 0.274 | 0.232 | 0.242 | 0.274 | 0.274 |
| Young's modulus: | | | | | | | | | |
| EM | kg/mm² | 720 | 970 | 620 | 720 | 970 | 580 | 720 | 720 |
| ET | " | 750 | 630 | 1080 | 750 | 540 | 620 | 750 | 750 |
| Surface roughness (Ra) | nm | 9 | 5 | 7 | 29 | 28 | 8 | 9 | 1.5 |
| Heat shrinkage (machine direction 70° C. × 1 hr) | % | 0.06 | 0.06 | 0.05 | 0.06 | 0.06 | 0.03 | 0.12 | 0.05 |
| Defect-free product ratio of rolled tape | % | 95 | 98 | 98 | 98 | 70 | 95 | 95 | rolling up impossible |
| Tape properties | | | | | | | | | |
| Electromagnetic characteristics (Y-S/N) | dB | +1.5 | +3.5 | +2.8 | −2.0 | −4.0 | 0 | 0 | — |
| Running durability | — | ◯ | ◯ | ◯ | Δ | X | Δ | ◯ | — |
| Skew | μsec | 3 | 3 | 3 | 2 | 3 | 3 | 10 | — |

EXAMPLE 4

A biaxially oriented film having a thickness of 7 μm was obtained in the same manner as in Example 2 except that the silica particles and calcium carbonate particles as inert solid fine particles were replaced with 0.2% by weight of calcium carbonate particles (non-agglomerate particles) having an average particle diameter of 0.4 μm. Thereafter, the biaxially oriented film was treated in the same manner as in Example 1 to obtain a magnetic tape. Table 2 shows the results. The results were as excellent as those in Example. 1.

EXAMPLE 5

A biaxially oriented film having a thickness of 7 μm was obtained in the same manner as in Example 2 except that the silica particles and calcium carbonate particles as inert solid fine particles were replaced with 0.01% by weight of kaolin particles (non-agglomerate particles) having an average particle diameter of 0.15 μm and 0.01% by weight of calcium carbonate particles (non-agglomerate particles) having an average particle diameter of 0.6 μm. Thereafter, the biaxially oriented film was treated in the same manner as in Example 1 to obtain a magnetic tape. Table 2 shows the results. The results were as excellent as those in Example 1.

EXAMPLE 6

A biaxially oriented film having a thickness of 7 μm was obtained in the same manner as in Example 2 except that the silica particles and calcium carbonate particles as inert solid fine particles were replaced with 0.15% by weight of kaolin particles (non-agglomerate particles) having an average particle diameter of 0.3 μm. Thereafter, the biaxially oriented film was treated in the same manner as in Example 1 to obtain a magnetic tape. Table 2 shows the results. The results were as excellent as those in Example 1.

TABLE 2

|  | Unit | Ex. 4 | Ex. 5 | Ex. 6 |
|---|---|---|---|---|
| Base film properties | | | | |
| Number of protrusions on surface | | | | |
| $M_1$ ($1 \leq h < 50$) | pcs/mm² | 15619 | 9558 | 6372 |
| $M_2$ ($50 \leq h < 100$) | " | 64 | 76 | 130 |
| $M_3$ ($100 \leq h$) | " | 6 | 48 | 25 |
| Refractive index: | | | | |
| $n_x$ | — | 1.777 | 1.777 | 1.727 |
| $n_y$ | — | 1.731 | 1.731 | 1.794 |
| $n_z$ | — | 1.482 | 1.482 | 1.482 |
| Average refractive index: $N_a$ | — | 1.664 | 1.664 | 1.664 |
| $1.607 N_a - 2.434$ | — | 0.240 | 0.240 | 0.240 |
| Plane orientation coefficient: NS | — | 0.272 | 0.272 | 0.272 |
| Young's modulus: | | | | |
| EM | kg/mm² | 970 | 970 | 970 |
| ET | " | 630 | 630 | 630 |
| Surface roughness (Ra) | nm | 9 | 9 | 10 |
| Heat shrinkage (machine direction 70° C. × 1 hr) | % | 0.05 | 0.05 | 0.05 |
| Defect-free product ratio of rolled tape | % | 98 | 98 | 90 |
| Tape properties | | | | |
| Electromagnetic | dB | +2.5 | +1.8 | +1.5 |

TABLE 2-continued

| | Unit | Ex. 4 | Ex. 5 | Ex. 6 |
|---|---|---|---|---|
| characteristics (Y-S/N) | | | | |
| Running durability | — | ◯ | ◯ | ◯ |
| Skew | μsec | 3 | 3 | 3 |

As specified above, the film provided by the present invention can be easily taken up in the form of a roll, and is useful as a base film for high-density recording media which are excellent in running durability, electromagnetic characteristics and freedom from skew strain and which permit recording for a long period of time, particularly for a 8-mm video tape, a digital.audio tape (DAT) and a digital.compact.cassette tape (DCC).

What is claimed is:

1. A biaxially oriented polyethylene-2,6-napthalenedicarboxylate film which satisfies the following expressions (1)–(3), $$1{,}000 \leq M_1 \leq 20{,}000 \text{ pieces/mm}^2 \quad (1)$$

$$0 \leq M_2 \leq 200 \text{ pieces/mm}^2 \quad (2)$$

$$0 \leq M_3 \leq 50 \text{ pieces/mm}^2 \quad (3)$$

wherein when h (unit: nm) stands for a height of a protrusion formed on the film surface, $M_1$ (unit: pieces/mm$^2$) is the number of protrusions in the range of $1 \leq h < 50$, $M_2$ (unit: pieces/mm$^2$) is the number of protrusions in the range of $50 \leq h < 100$, and $M_3$ (unit: pieces/mm$^2$) is the number of protrusions in the range of $100 \leq h$, the film having a plane orientation coefficient NS and an average refractive index $n_a$ which satisfy the following expression $$NS \geq 1.607 n_a - 2.434, \quad (4)$$

the film having a surface roughness (Ra) of 2–10 nm and having a heat shrinkage in the longitudinal direction of 0.08% or less when treated under no load at 70° C. for 1 hour.

2. The biaxially oriented polyethylene-2,6-naphthalenedicarboxylate film of claim 1, wherein $M_1$, M2 and $M_3$ satisfy the following expressions, $$1{,}500 \leq M_1 \leq 20{,}000 \text{ pieces/mm}^2$$

$$5 \leq M_2 \leq 200 \text{ pieces/mm}^2$$

$$0 \leq M_3 \leq 50 \text{ pieces/mm}^2.$$

3. The biaxially oriented polyethylene-2,6-naphthalenedicarboxylate film of claim 1, wherein $M_1$, $M_2$ and $M_3$ satisfy the following expressions, $$2{,}000 \leq M_1 \leq 15{,}000 \text{ pieces/mm}^2$$

$$10 \leq M_2 \leq 150 \text{ pieces/mm}^2$$

$$0 \leq M_3 40 \text{ pieces/mm}^2.$$

4. The biaxially oriented polyethylene-2,6-naphthalenedicarboxylate film of claim 1, wherein $M_1$, $M_2$ and $M_3$ satisfy the following expressions, $$2{,}000 \leq M_1 \leq 5000 \text{ pieces/mm}^2$$

$$10 \leq M_2 \leq 100 \text{ pieces/mm}^2$$

$$0 \leq M_3 \leq 30 \text{ pieces/mm}^2.$$

5. The biaxially oriented polyethylene-2,6-naphthalenedicarboxylate film of claim 1, which has the surface roughness (Ra) of 5–10 nm.

6. The biaxially oriented polyethylene-2,6-naphthalenedicarboxylate film of claim 1, which has a Young's modulus (EM) of at least 600 kg/mm$^2$ in the longitudinal direction and a Young's modulus (ET) of 600–1,100 kg/mm$^2$ in the transverse direction.

7. The biaxially oriented polyethylene-2,6-naphthalenedicarboxylate film of claim 1, which has a thickness of 75 μm or less.

8. The biaxially oriented polyethylene-2,6-naphthalenedicarboxylate film of claim 1, which is a base film for a magnetic recording medium.

9. The biaxially oriented polyethylene-2,6-naphthalenedicarboxylate film of claim 8, wherein the magnetic recording medium is a magnetic tape.

10. A magnetic recording medium comprising the biaxially oriented polyethylene-2,6-naphthalenedicarboxylate film of claim 1 as a base film for the magnetic recording medium.

11. A magnetic tape comprising the magnetic recording medium of claim 10.

12. A magnetic recording medium comprising the biaxially oriented polyethylene-2,6-naphthalenedicarboxylate film of claim 1 and a magnetic recording layer on at least one surface of said film.

13. A biaxially oriented polyethylene-2,6-naphthalenedicarboxylate film which satisfies the following expressions (1)–(3), $$1{,}500 \leq M_1 \leq 20{,}000 \text{ pieces/mm}^2 \quad (1)$$

$$5 \leq M_2 \leq 200 \text{ pieces/mm}^2 \quad (2)$$

$$0 \leq M_3 \leq 50 \text{ pieces/mm}^2 \quad (3)$$

wherein when h (unit: nm) stands for a height of a protrusion formed on the film surface, $M_1$ (unit: pieces/mm$^2$) is the number of protrusions in the range of $1 \leq h < 50$, $M_2$ (unit: pieces/mm$^2$) is the number of protrusions in the range of $50 \leq h < 100$, and $M_3$ (unit: pieces/mm$^2$) is the number of protrusions in the range of $100 \leq h$, the film having a Young's modulus (EM) of at least 600 kg/mm$^2$ in the longitudinal direction and a Young's modulus (ET) of 600–1,100 kg/mm$^2$ in the transverse direction, the film having a plane orientation coefficient NS and an average refractive index $n_a$ which satisfy the following expression $$NS \leq 1.607 n_a - 2.434, \quad (4)$$

the film having a surface roughness (Ra) of 2–10 nm, a thickness of 50 μm or less and having a heat shrinkage in the longitudinal direction of 0.08% or less when treated under no load at 70° C. for 1 hour.

14. The biaxially oriented polyethylene-2,6-naphthalenedicarboxylate film of claim 13 which has a heat shrinkage in the longitudinal direction of 0.06% or less when treated under no load at 70° C. for 1 hour.

15. The biaxially oriented polyethylene-2,6-naphthalenedicarboxylate film of claim 13 which has a thickness of 2–12 μm.

16. A magnetic recording medium comprising a
biaxially oriented polyethylene-2,6-naphthalenedicarboxylate film which satisfies the following expressions (1)–(3), $$2{,}000 \leqq M_1 \leqq 20{,}000 \text{ pieces/mm}^2 \quad (1)$$

$$10 \leqq M_2 \leqq 150 \text{ pieces/mm}^2 \quad (2)$$

$$0 \leqq M_3 \leqq 40 \text{ pieces/mm}^2 \quad (3)$$

wherein when h (unit: nm) stands for a height of a protrusion formed on the film surface, $M_1$ (unit: pieces/mm$^2$) is the number of protrusions in the range of $1 \leqq h < 50$, $M_2$ (unit: pieces/mm$^2$) is the number of protrusions in the range of $50 \leqq h < 100$, and $M_3$ (unit: pieces/mm$^2$) is the number of protrusions in the range of $100 \leqq h$, the film having a Young's modulus (EM) of at least 600 kg/mm$^2$ in the longitudinal direction and a Young's modulus (ET) of 600–1,100 kg/mm$^2$ in the transverse direction, the film having a plane orientation coefficient NS and an average refractive index $n_a$ which satisfy the following expression $$NS \geqq 1.607 n_a - 2.434, \quad (4)$$

the film having a surface roughness (Ra) of 5–10 nm, a thickness of 25 μm or less and having a heat shrinkage in the longitudinal direction of 0.08% or less when treated under no load at 70° C. for 1 hour, and having a magnetic recording layer on at least one surface of said film.

17. The biaxially oriented polyethylene-2,6-naphthalenedicarboxylate film of claim 16 which has a heat shrinkage in the longitudinal direction of 0.06% or less when treated under no load at 70° C. for 1 hour.

18. The biaxially oriented polyethylene-2,6-naphthalenedicarboxylate film of claim 16 which has a thickness of 2–12 μm.

* * * * *

UNITED STATES PATENT AND TRADEMARK OFFICE
CERTIFICATE OF CORRECTION

PATENT NO. : 5,494,739
DATED : February 27, 1996
INVENTOR(S) : Takao Chuujou, et al.

It is certified that error appears in the above-indentified patent and that said Letters Patent is hereby corrected as shown below:

On the title page:

In Item [22], change the PCT Filed: from "Oct. 4, 1993" to --Oct. 30, 1992--.

Signed and Sealed this

Sixteenth Day of July, 1996

Attest:

BRUCE LEHMAN

Attesting Officer         Commissioner of Patents and Trademarks